US012169732B2

(12) United States Patent
Gizis et al.

(10) Patent No.: US 12,169,732 B2
(45) Date of Patent: Dec. 17, 2024

(54) REUSING SOFTWARE APPLICATION CONTAINERS

(71) Applicant: Connectify, Inc., Philadelphia, PA (US)

(72) Inventors: Alexander Gizis, Philadelphia, PA (US); Brian Prodoehl, Plymouth Meeting, PA (US); Kevin Cunningham, Swarthmore, PA (US)

(73) Assignee: CONNECTIFY, INC., Philadelphia, PA (US)

( * ) Notice: Subject to any disclaimer, the term of this patent is extended or adjusted under 35 U.S.C. 154(b) by 71 days.

(21) Appl. No.: 17/673,774

(22) Filed: Feb. 16, 2022

(65) Prior Publication Data

US 2022/0261270 A1     Aug. 18, 2022

Related U.S. Application Data

(60) Provisional application No. 63/150,536, filed on Feb. 17, 2021.

(51) Int. Cl.
*G06F 9/455* (2018.01)
*H04L 9/40* (2022.01)
*H04L 61/4511* (2022.01)
*H04L 69/163* (2022.01)

(52) U.S. Cl.
CPC ...... *G06F 9/45558* (2013.01); *H04L 61/4511* (2022.05); *H04L 63/0236* (2013.01); *H04L 63/0281* (2013.01); *H04L 69/163* (2013.01); *G06F 2009/45579* (2013.01); *G06F 2009/45595* (2013.01)

(58) Field of Classification Search
CPC ....... G06F 9/45558; G06F 2009/45579; G06F 2009/45595; G06F 8/36; H04L 61/4511; H04L 63/0236; H04L 63/0281; H04L 69/163; H04L 63/0272
See application file for complete search history.

(56) References Cited

U.S. PATENT DOCUMENTS

| | | | |
|---|---|---|---|
| 8,732,814 B2 * | 5/2014 | Radhakrishnan | H04L 63/105 709/227 |
| 9,367,397 B1 * | 6/2016 | Xie | G06F 12/0261 |
| 10,871,995 B2 * | 12/2020 | Gerdesmeier | G06F 9/5077 |
| 2003/0163787 A1 * | 8/2003 | Hay | G06Q 30/06 715/248 |
| 2003/0225839 A1 * | 12/2003 | Kopunovic | H04L 45/00 709/206 |
| 2013/0047203 A1 * | 2/2013 | Radhakrishnan | G06F 21/577 726/1 |

(Continued)

*Primary Examiner* — Nicholas P Celani
*Assistant Examiner* — Wuji Chen
(74) *Attorney, Agent, or Firm* — Kamran Emdadi

(57) ABSTRACT

One example process may include modifying a status of a container after a communication session associated with the container has ended, receiving a token from a client device to establish a communication session with a virtual machine, assigning the client device to the container, updating a container state file to include the token, a file version and a client device identifier, and responsive to assigning the client device, initiating one or more container processes with the container and maintaining one or more container processes already operating in an active status with the container prior to the assignment.

17 Claims, 7 Drawing Sheets

(56) References Cited

U.S. PATENT DOCUMENTS

| | | | | |
|---|---|---|---|---|
| 2013/0145172 A1* | 6/2013 | Shablygin | G06F 21/33 | 713/185 |
| 2013/0145173 A1* | 6/2013 | Shablygin | G06F 21/34 | 713/185 |
| 2015/0281111 A1* | 10/2015 | Carl | H04L 61/4511 | 709/226 |
| 2017/0170990 A1* | 6/2017 | Gaddehosur | H04L 41/122 | |
| 2017/0177877 A1* | 6/2017 | Suarez | G06F 16/2455 | |
| 2017/0180250 A1* | 6/2017 | Shen | H04L 45/586 | |
| 2017/0244787 A1* | 8/2017 | Rangasamy | H04L 43/0817 | |
| 2018/0060057 A1* | 3/2018 | Dake | G06F 9/45516 | |
| 2018/0088993 A1* | 3/2018 | Gerdesmeier | G06F 9/5005 | |
| 2018/0123954 A1* | 5/2018 | Jiang | H04L 49/70 | |
| 2018/0270124 A1* | 9/2018 | Chugtu | G06F 8/60 | |
| 2019/0059117 A1* | 2/2019 | Shu | H04W 76/25 | |
| 2019/0102206 A1* | 4/2019 | Fichtenholtz | G06F 9/5027 | |
| 2020/0053026 A1* | 2/2020 | Rangachari | H04L 45/44 | |
| 2020/0073692 A1* | 3/2020 | Rao | H04L 12/4633 | |
| 2020/0355390 A1* | 11/2020 | Chen | F24F 11/54 | |
| 2021/0026703 A1* | 1/2021 | Fichtenholtz | G06F 9/5005 | |
| 2021/0248214 A1* | 8/2021 | Goldston | G06F 16/686 | |
| 2021/0328793 A1* | 10/2021 | Saravanan | H04L 9/3213 | |
| 2022/0329457 A1* | 10/2022 | Zaicenko | G06F 11/1469 | |
| 2022/0405217 A1* | 12/2022 | Amaro, Jr. | G06F 13/20 | |

* cited by examiner

270

REUSING SOFTWARE APPLICATION CONTAINERS

TECHNICAL FIELD

This application relates to reusing containers, and more specifically to maintaining containers between different client sessions for optimal container recycling.

BACKGROUND

Conventionally, creating and tearing down software containers is resource intensive. In addition to initiating the processes included in a container, the container may require a filesystem, firewall, network interface(s), etc., and may allocate many of the resources available form a server.

There is some expectation that container resource allocation should become more optimal as certain related technologies mature, but the progress has been unsatisfactory. In fact, the amount of time to create and eliminate containers has actually increased for many popular container platforms. Instead of destroying containers the moment they are not employed for their current purpose, certain container resources could be maintained until they are reallocated for a new purpose and/or different client. With hundreds and sometimes even more containers operating at a particular time, the total time and resources which are saved by not eliminating the containers each time a changeover event occurs may increase optimal container use and allocation.

SUMMARY

Example embodiments of the present application include a process which may include modifying a status of a container after a communication session associated with the container has ended, receiving a token from a client device to establish a communication session with a virtual machine, assigning the client device to the container, updating a container state file to include the token, a file version and a client device identifier, and responsive to assigning the client device, initiating one or more container processes with the container and maintaining one or more container processes already operating in an active status with the container prior to the assignment.

Another example embodiment may include an apparatus that includes a processor configured to modify a status of a container after a communication session associated with the container has ended, and a receiver configured to receive a token from a client device to establish a communication session with a virtual machine, and the processor is further configured to assign the client device to the container, update a container state file to include the token, a file version and a client device identifier, and responsive to the client device being assigned, initiate one or more container processes with the container and maintain one or more container processes already operating in an active status with the container prior to the assignment.

Still another example embodiment may include a non-transitory computer readable medium configured to store instructions that when executed causes a processor to perform modifying a status of a container after a communication session associated with the container has ended, receiving a token from a client device to establish a communication session with a virtual machine, assigning the client device to the container, updating a container state file to include the token, a file version and a client device identifier, and responsive to assigning the client device, initiating one or more container processes with the container and maintaining one or more container processes already operating in an active status with the container prior to the assignment.

DETAILED DESCRIPTION

Figure 1:
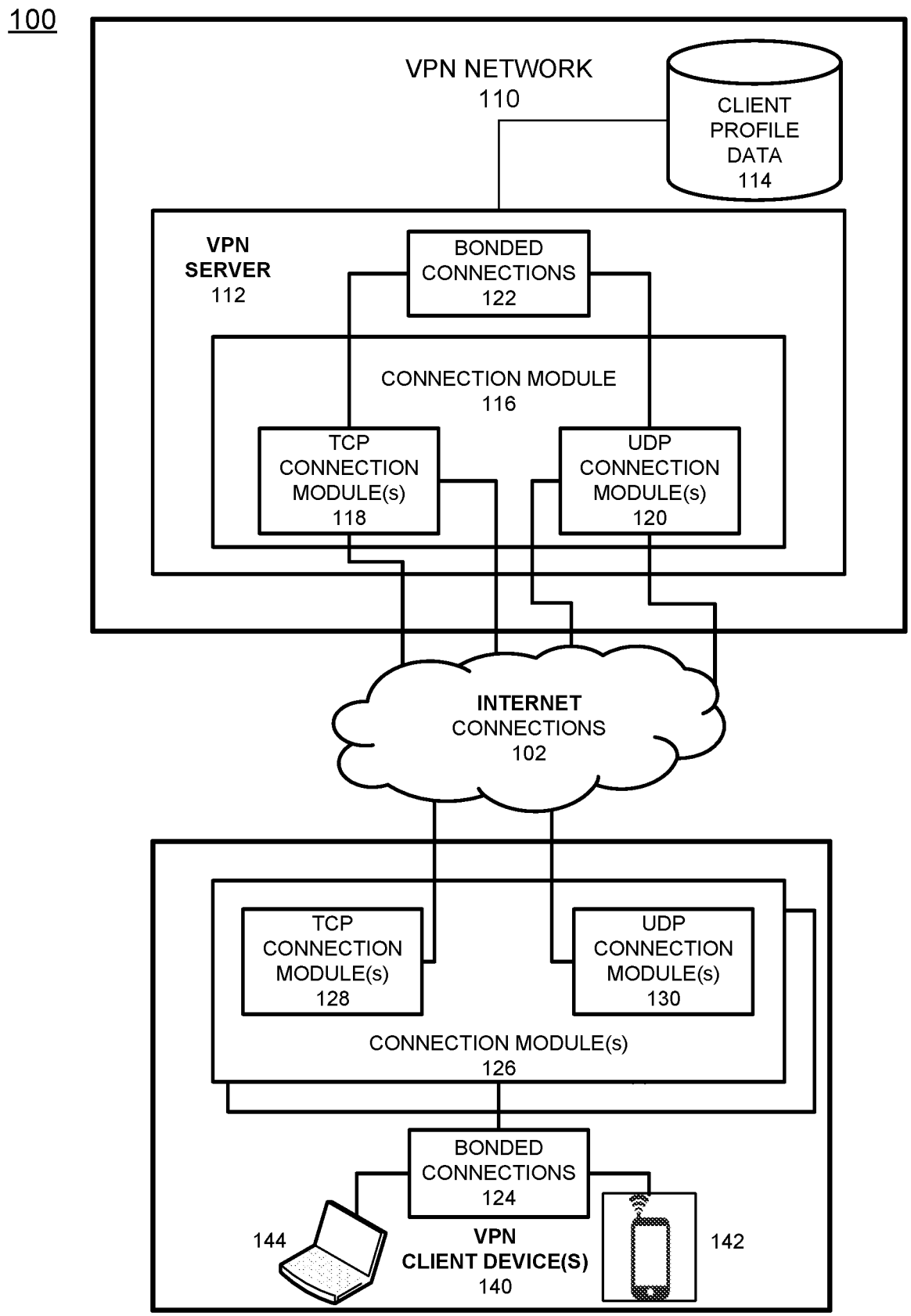
FIG. 1 illustrates an example data session network configuration according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide container creation and preservation cycles which optimize container usage especially when attempting to reassign a container to a new client device and/or session. According to one example, a pool of containers may be initiated at system startup prior to client session creation events. This approach permits one or more currently created containers to be accessed and utilized for a particular client data application session without a particular container creation and instead relying on a container assignment process. For example, as the client application initiates to provide a client device with remote access to a container managed application, a data token (i.e., credentials) may be received and applied to already-running containers when a new client session is identified. For example, an application programming interface (API) create request which may be invoked during a new session, can be received and processed to customize the existing container for the session.

Example embodiments may be referred to with reference to a communication 'session'. The term session may be a communication data link between a client and server or any two or more network-based entities in communication across a data communication network. A session may be based on a single communication link or channel or multiple links or channels. Examples of multiple channels being used in a session may be based on multiple network interface devices (i.e., network interface cards (NICs)) being used in a single session, multiple TCP/UDP sockets being created in a single session among other device resources. Multiple transport connections which are established via TCP and/or UDP may also be considered a session. Additionally, encryption that is used for the session may be independently established to include a unique key for each transport connection and/or channel established for the session. The session encryption may instead by a single key encryption used to encrypt all the communication exchanges during the session. In general, most transport connections are encrypted independently. All of the described examples of a session may be adapted to include one or more alternatives or combinations thereof. Each session may be subjected to multiple different communication mediums providing a variety of one or more channels, transports, radio links, physical links, network interface cards and wireless and/or wired connections.

The network connection optimization for an application server providing data network access through communication channels to one or more client devices. Data communication protocols may include one or more of a transmission control protocol (TCP) and/or a user datagram protocol (UDP). Also, the TCP/IP protocol suite enables the determination of how a specific device should be connected to the Internet and how data can be exchanged by enabling a virtual network when multiple network devices are connected. TCP/IP stands for transmission control protocol/Internet protocol and it is specifically designed as a model to offer reliable data byte streams over various interconnected data networks.

UDP is a datagram/packet oriented protocol used for broadcast and multicast types of network transmissions. The UDP protocol works similar to TCP, but with some of the error-checking criteria removed which reduces the amount of back-and-forth communication and deliverability requirements.

TCP is a connection-oriented protocol and UDP is a connectionless protocol. The speeds associated with TCP are generally slower than UDP, while the speed of UDP are generally faster within the network with regard to sending data across a network. TCP uses a 'handshake' protocol such as 'SYN', 'SYN-ACK', 'ACK', etc., while UDP uses no handshake protocols. TCP performs error checking and error recovery, and UDP performs error checking, but discards erroneous packets. TCP employs acknowledgment segments, but UDP does not have any acknowledgment segment.

A TCP connection is established with a three-way handshake, which is a process of initiating and acknowledging a connection. Once the connection is established, data transfer begins and when the transmission process is finished the connection is terminated by the closing of an established virtual circuit. UDP uses a simple transmission approach without implied hand-shaking requirements for ordering, reliability, or data integrity. UDP also disregards error checking and correction efforts to avoid the overhead of such processing efforts at the network interface level, and is also compatible with packet broadcasts and multicasting.

TCP reads data as streams of bytes, and the message is transmitted to segment boundaries. UDP messages contain packets that were sent one by one. It also checks for integrity at the arrival time. TCP messages move across the Internet from one computer to another. It is not connection-based, so one program can send lots of packets to another. TCP rearranges data packets in a specific order. UDP protocol has no fixed order because all the packets are independent of each other. The speed for TCP is slower and UDP is faster since error recovery is omitted from UDP. The header sizes are 20 bytes and 8 bytes for TCP and UDP, respectively.

In general, TCP requires three packets to set up a socket connection before any user data can be sent. UDP does not require three packets for socket setup. TCP performs error checking and also error recovery and UDP performs error checking, but discards erroneous packets. TCP is reliable as it guarantees delivery of data to the destination router. The delivery of data to the destination is not guaranteed by UDP. UDP is ideal to use with multimedia like voice over IP (VoIP) since minimizing delays is critical. TCP sockets should be used when both the client and the server independently send packets and an occasional delay is acceptable. UDP should be used if both the client and the server separately send packets, and an occasional delay is not acceptable.

FIG. 1 illustrates an example data session network configuration according to example embodiments. Referring to FIG. 1, the configuration 100 may include a virtual private network (VPN) 110 which includes one or more VPN servers 112 and data storage, which in this case is used for storing client profile data 114 associated with one or more new or old client communication sessions. The communication sessions may include multiple network channels, generally, UDP and TCP are used for such sessions, however, other protocols used across the Internet 102 may also be used, such as HTTPS. The channels may be bonded together to create a single virtual channel for communication as shown from the bonded connections module 122 for the VPN server 112 and the bonded connections module 124 of the client device 140. In general, the VPN 112 may include UDP module(s) 120 and a TCP module(s) 118 as part of a connection module 116 to manage the connection process and a bonded connections module 122 to manage the various channels and the bonding of information among the channels.

The client side may include one or more client devices 140 such as a smartphone 142, cell phone, tablet, laptop 144, etc. Any one of those individual devices may be the 'client device' 140 at any particular time for a particular session.

The client side may have an installed agent software application that communicates with the cloud servers of the VPN network 110. The communications are established and maintained across the Internet 102. The client side may also have its own bonded connections module 124 which manages one or more TCP/UDP connections associated with TCP/UDP connection modules 128/130, each of which may have multiple modules to accommodate multiple session, as part of the connection module(s) 126 of the client side. The module 126 may be multiple modules which are used for multiple respective sessions with various end user devices 140.

In general, a transport connection is a connection between the VPN client and the VPN server over a particular network and/or Internet connection using a particular protocol, such as TCP, UDP, HTTPS, or another protocol. The established connection is used to send encapsulated and/or encrypted application packets between the client and the server. In one example embodiment, multiple transports connections are created for each session over the available networks and protocols. Conventionally, a VPN will create one transport connection over one network with one protocol per session. For example, given two networks to utilize, the data connection optimization application may create three transport connections (e.g., TCP, UDP, and HTTPS) over each network, for a total of six transport connections. Other combinations of connection types, numbers of connections, etc., may also be utilized.

Example embodiments may be referred to with reference to one or more 'sessions'. The term session(s) may be a communication data link between a client and server based on one or multiple sessions. Sessions may be established between any two network elements. Each sessions may have additional sessions within itself, such as an encryption session being established within one communication channel session and additional encryption sessions being established on other communication channel sessions. The plurality of communication channels or sessions may be bonded into a single channel or session which is composed of multiple communication sessions and respective encryption sessions.

In another example embodiment, other ways to achieve optimal container use might include using modified containers, such as designated virtual server processes or a particular operational virtual server that can fairly handle many concurrent sessions without the need for a particular container. However, the examples included herein are referring to container use unless specified otherwise.

In another example, the container could be accessed by receiving new tokens and a requested application version, and conveying the state of the container if it is available for use at that time. One approach to preparing and assigning containers between client sessions may include removing data logs between user sessions. The process responsible for creating the new client session would also need read-only access to all supported versions of the binary and a way of spawning the requested binary with the security token in the environment for the spawned process to emerge. These binaries could be in a host volume stored in an accessible link to the container, and so pushing new versions of the client software does not require a container restart of the container pool.

The size of the pool would mostly be dependent on the amount of memory the system has available at a particular time, the memory may be allocated according to a limited value which is based on the number of CPU cores being implemented throughout the pool of containers. In response to API create requests being received, the virtual machine responsible for managing the pool of containers would have to pass the generated security token to an available container. The virtual machine would also need to monitor the available/occupied state of the running containers, and be able to link the usage activity of a container(s) to the appropriate user for authentication, authorization and accounting (AAA).

In one example of container changes resulting from a contain changeover event, new token(s) data may be received along with a specific filesystem version specified by a container status change. A script may be used to perform changeover actions, such as using a mounted host volume to read environment variables including the token and data version, and write the container state, such as "busy" or "available". A basic flow which may occur when a container is "available" may include writing a 'VERSION', 'TOKEN', 'USER' and 'START_TIME' to a management file, and then share a filesystem and other information to the container. The management file is stored on a filesystem that is shared between the manager process and the container. The script may receive a signal, load the environment variables from the management file, and launch the requested version of server in the container.

All versions of server are maintained in a read-only storage volume. The idle or 'available' containers do not have a specific server process that is operating at a particular time, and instead those containers wait with no timeout parameters, so they utilize little CPU and memory resources while awaiting a claim and launch procedure.

When a server process exits, either because the client device disconnected, the session was inactive for too long a period of time and/or the session crashed, the supervising shell script can clear the old management file, the environment data, the log files, and then set the container state to 'available'. The server process manager and other processes can identify which containers are busy with an active session, which versions those containers are currently operating, and which users/client devices are being served by monitoring an updated file record and and/or via a Javascript monitoring and management file which can provide notifications as soon as a container goes from 'busy' to 'available'.

In example embodiments, a server container may operate the server-side component of a VPN connection for a single user or single client device. When a VPN connection is established through one of a pool of managing servers, that request is provided to a container by a central speed server manager process that runs on each speed server. The container launches a daemon process that corresponds to the client's software version. A parent process may be part of each server process that manages the lifecycle of the container, monitors for signals from the speed server manager, and launches the appropriate subprocesses, and also removes data between user sessions.

Example processes may include the parent process, the server process, which manages packets, encryption/decryption, etc., a domain name system (DNS) server which manages all DNS requests for that user session, a TCP proxy which terminates all TCP connections from the client device applications, permitting the negotiation of fast TCP connections to online services and overall optimal network speeds. An optional speed testing process, may be used to test activities and report data about the container performance. In general, a root filesystem of a server container is read-only, and only a few paths are mounted with write permission.

Each container may create its own virtual network adapter(s) used to manage data communications to and from the container.

The server containers are independent of one another. They share a network bridge, but typically cannot communicate with each other. They share processor resources and are operating under the same kernel, which is responsible for ensuring fair usage of resources. In general, one server container serves one active client. When a client session ends, its server daemon process exits, and the server container's parent script removes any remnants of the previous user session including any log files, removes any remaining processes associated with that session (DNS server, TCP proxy, etc.), and returns to the 'available' state.

In one example, during a communication session setup procedure, a public IP port may be forwarded from the container server to the client device to enable use of a web server on their device that is accessible on the Internet. The IP address can be set up at server container creation time and cannot be changed once a container is operational.

One example embodiment may include a software manager as a cloud based management application that creates and initiates new server containers, making sure that there are at least a certain number of available containers and that the available memory on the host is above some threshold, however, the number of containers and memory allocation are both adjustable parameters along with other container resource allocation parameters, such as memory, CPU utilization, network resources (IP addresses, port allocations, bandwidth constraints), virtual network adapters, etc.

In this example, the server parent process initiates and sets a state file to 'available' to identify one or more containers, waits for a signal from the manager process, which receives a user request to start a session from a user interface API of an application that communicates with the cloud server application. The parent process verifies the user is authorized to connect by name, password, hardware ID, etc., and generates secure token, selects a server container with a state 'available', writes a user software version, user ID, and secure token to the server environment file or manager file, sends a signal to the server container, and the server parent process receives the signal and ends the wait status and checks for an exit file, and exits if it exists thus terminating the container. Otherwise, the parent process sets the state file to 'busy', loads the environment file containing a software version, user ID, and secure token into the local environment, launches a TCP proxy service for that user session, which creates a TCP based session link, launches a DNS server for that user session including requesting and receiving an IP address or any other information for network access, and launches other processes.

There may be times when the server manager controls a container to perform an exit operation to unload the current application using the container and any active sessions, after the current VPN session has ended. This may be performed because there is a newer version of the container that the server manager is attempting to use in its place, or it may be because the server is scheduled for maintenance, or it may be over-utilized and looking to free-up resources, one skilled in art will appreciate other options for a server ending a container's usage. In these cases, the server manager can create an exit file that the container can identify. Locally, from within the container, the file is located at a particular file source path (e.g., /x/y/z/exit), but from the server manager's perspective, the file may be located on a path specific to just that one container, so the server manager can write exit files for an arbitrary collection of containers. Creating the file has no immediate effect on a busy container. When the session ends the file is checked, and if it exists, the container exits. The process of ending a container usage via an exit file may be autonomous and may be performed prior to the container usage being stopped.

Continuing with the same example, the parent server process launches an in-app speed testing server for that user session, an 'iperf3' (speed testing) server may be used for that user session, and a server process matching the requested software version and waits for a signal or the server process to end. Additional and optional/secondary supporting processes may also be used to test network data. This may include other processes that are not the main VPN routing daemon process. The server parent process receives the signal or the server process ends, checks for an exit file, and exits if it exists terminating the container, clears the local environment, terminates the TCP proxy service, terminates the DNS server, terminates the in-app speed testing server, terminates the iperf3 speed testing server, terminates the server daemon process, if it is still running, and clears any log files from the previous user session, and sets a state file to 'available' and waits for a signal from the server manager.

At any point, the manager or a system administrator process can create an exit file for a server container, requesting that it exits the next time it releases from its wait loop. This is so one version of the server container image can be moved to another without needing to disrupt any user sessions. The exit file can be written to each container, and the next time they break from their loop and are not busy, they will exit, and the server manager can create a new one in its place.

When a session has ended or any other end of container use operation occurs, the container may be freed for use by another session and/or application use process. The 'exit' code, exit time, and a session identifier may be written to an exit file or similar data file to be read by a server manager process, and the state file is updated to say 'AVAILABLE', signifying to the server manager that the container is ready for a new session. The server manager may audit the container status or receive a notice of the state file being updated and perform an end-of-session 'bookkeeping' operation, which may include tallying a total amount of time and bytes used by the session, and reporting that information to a centralized usage accounting data file or data store, and that container may be marked in an internal table as once again available for new sessions so it can be identified and provided to a new session with potentially new client devices.

Figure 2A:
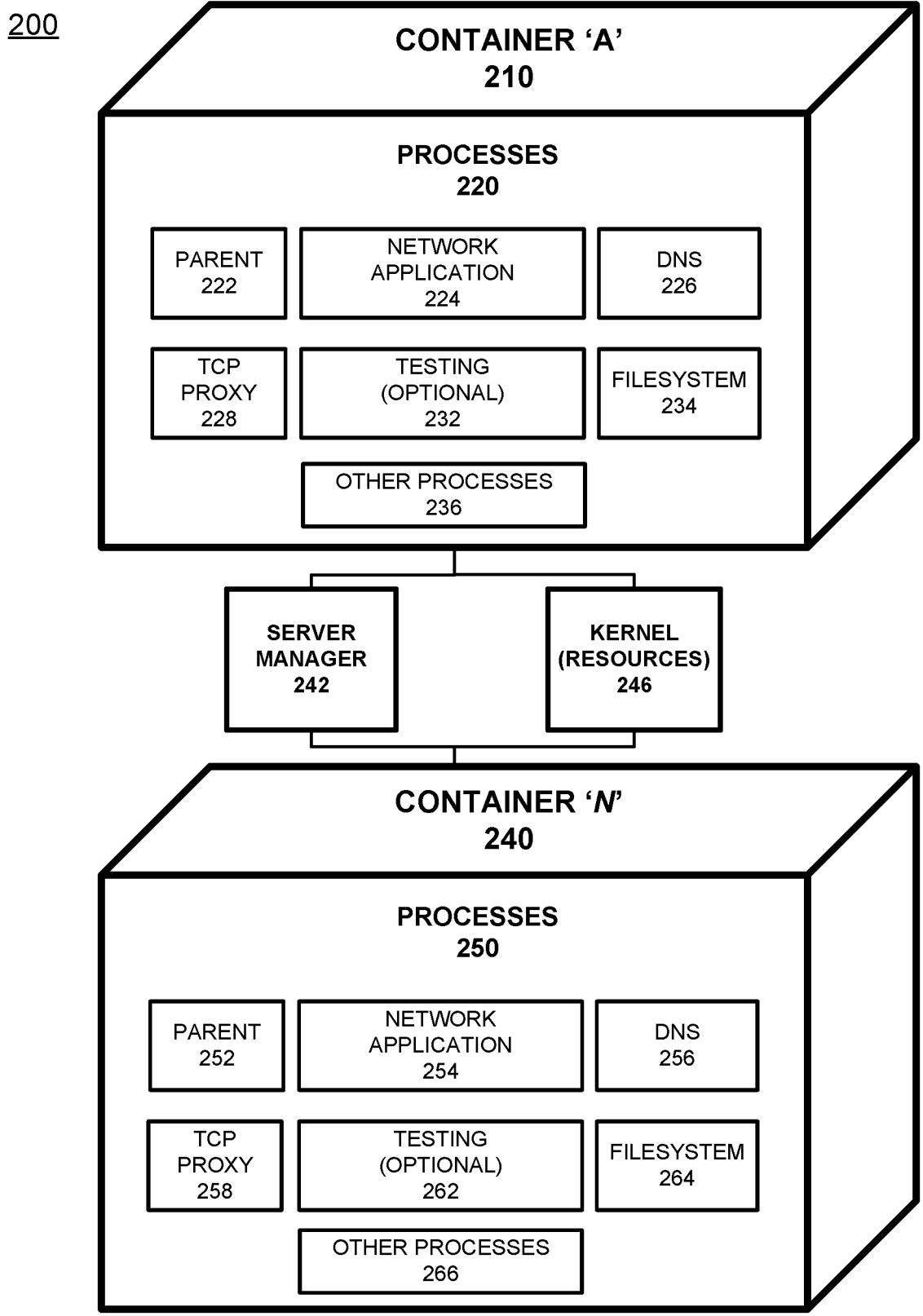
FIG. 2A illustrates an example configuration of multiple containers created and managed by a common set of resources according to example embodiments.

FIG. 2A illustrates an example configuration of multiple containers created and managed by a common set of resources according to example embodiments. Referring to FIG. 2A, the example 200 includes 'N' number of containers which are created during a container startup operation managed by a virtual machine in a cloud environment. The containers, such as container 'A' 210 may have a number of processes 2220 which are activated as part of an initial boot-up operation or some of which may be activated as part of an assignment to a particular client device session. Processes may include a parent process 222 which manages the other processes in the container 210. There may be a process 224 dedicated to the application, which in this example is a network application used to optimize a communication data session with a client device. Other processes may include a DNS process 226 responsible for establishing DNS related parameters for the container and client device, a TCP proxy process 228 which may manage data traffic via a TCP management function, testing process 232 used to track and manage various processes and their performance metrics, a filesystem process 234 may be a process that is dedicated to selection, execution and maintenance of a file process used by the container. Also, other processes 236 may also be utilized depending on the needs of the container and the client application(s) being supported.

In this example, the containers are managed by a server manager process 242 which may be part of a virtual machine used to manage multiple processes at a single time. Other resources may be made available in a group management function performed by a set of resources, such as a central kernel 246 used by the various containers. The other containers, such as container 'N' 240 may have a similar set of processes 250, including 252-266 operating separate from the other containers. The number of containers being actively maintained at any one time may be in the thousands, however, the number will vary depending on the needs of the cloud-based application.

In an available container, the application process 224 may not be operating. In this example, only the parent process 222 may be operational, and it is may in a dormant state, such as a 'sleeping' mode of operation and waiting to receive a signal to minimize resource utilization while being idle. The server manager establishes an available container by having it listed in the container runtime's list of running containers (in the case of the 'Docker' engine container runtime, the list of running containers using the Docker engine API may identified and filtered for containers with an expected naming pattern and of the particular server image type desired), and then the location of the state files may be identified for those operating containers read. An available container may be operating, have the correct image type, and its state file will be identified as either 'AVAILABLE' or 'BUSY'. Any container that falls out of the specification for either not being operational, or being operations and not having a state file may be terminated and removed by the server manager. From the container's perspective, in order to establish that it should transition from 'BUSY' to 'AVAILABLE' is having the application process perform an exit operation.

Figure 2B:
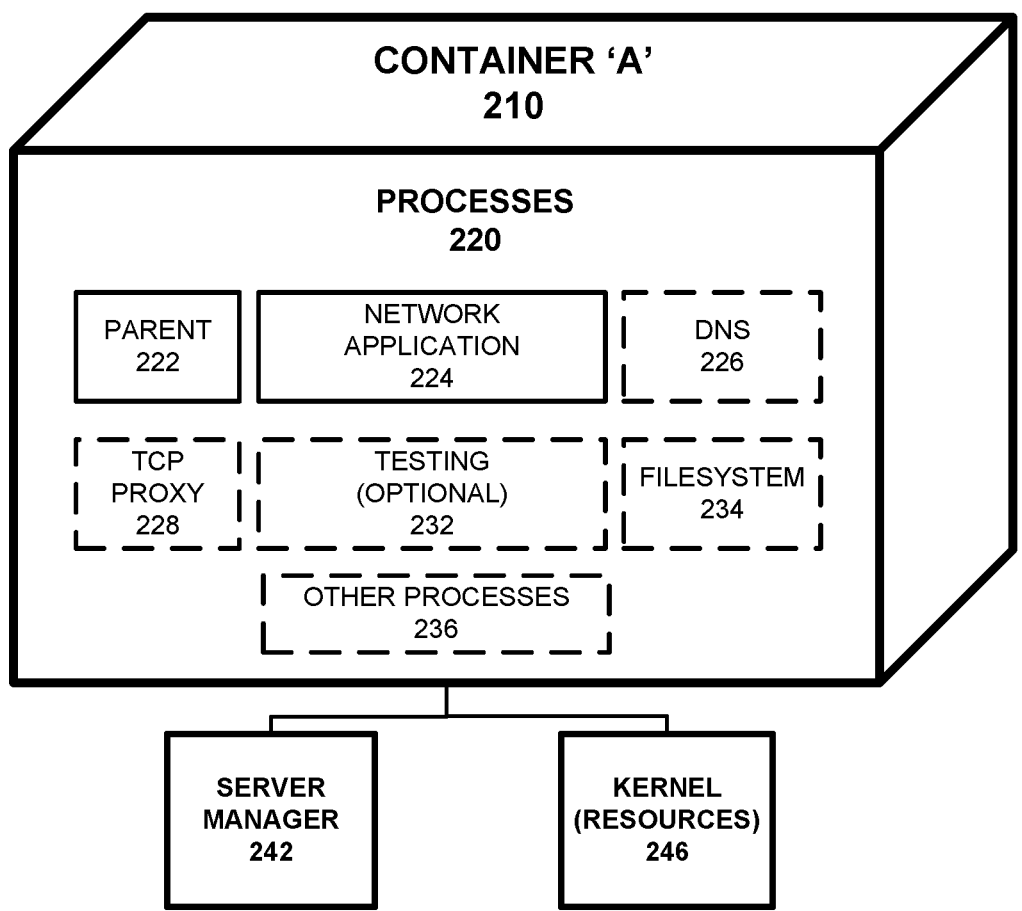
FIG. 2B illustrates an example configuration of a container having certain processes maintained and others removed between assignments according to example embodiments.

FIG. 2B illustrates an example configuration of a container having certain processes maintained and others removed between assignments according to example embodiments. Referring to FIG. 2B, the example 270 includes a container 210 with a number of processes 220, the ones with dotted lines 226, 228, 232, 234 and 236 may be session dependent processes which are retired/cancelled between container assignments. Other processes 222 and 224 may be maintained between sessions to optimize container assignments without requiring relaunch sequences for all processes. For example, certain network management processes may be maintained to continue a firewall function, a port and network address assignment range, virtual network adapters, etc. Those resources may be dedicated to maintain connections with other network resources so even though the container is not assigned to a particular device at a particular time, those processes are dedicated and will not require any time or resources to create between container assignments.

Figure 2C:
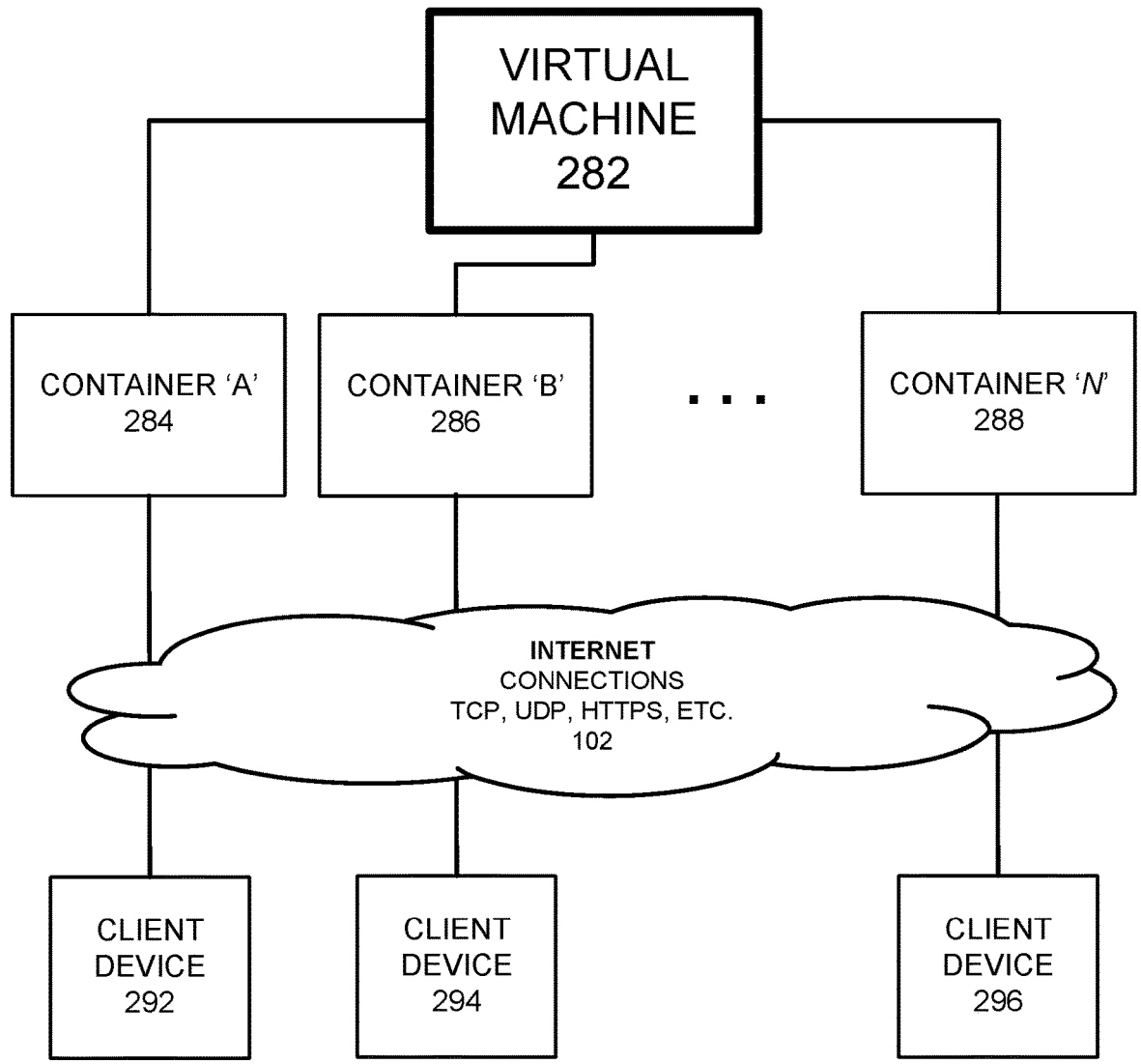
FIG. 2C illustrates an example configuration of a cloud-based virtual machine managing various containers according to example embodiments.

FIG. 2C illustrates an example configuration of a cloud-based virtual machine managing various containers according to example embodiments. Referring to FIG. 2C, the configuration 280 includes a virtual machine 282 which may be assigned to a group of containers as a management entity in the cloud. The various containers 284-288 may include any number of containers. The Internet network 102 may be used as a backbone for any specific type of network connection and bonding of multiple connections to establish an optima data communication session for each client device 292-296. The assignment of client devise to a container may be a 1-1 relationship, however other configurations may be used as well, such as one container to multiple client devices and vice versa.

Figure 3:
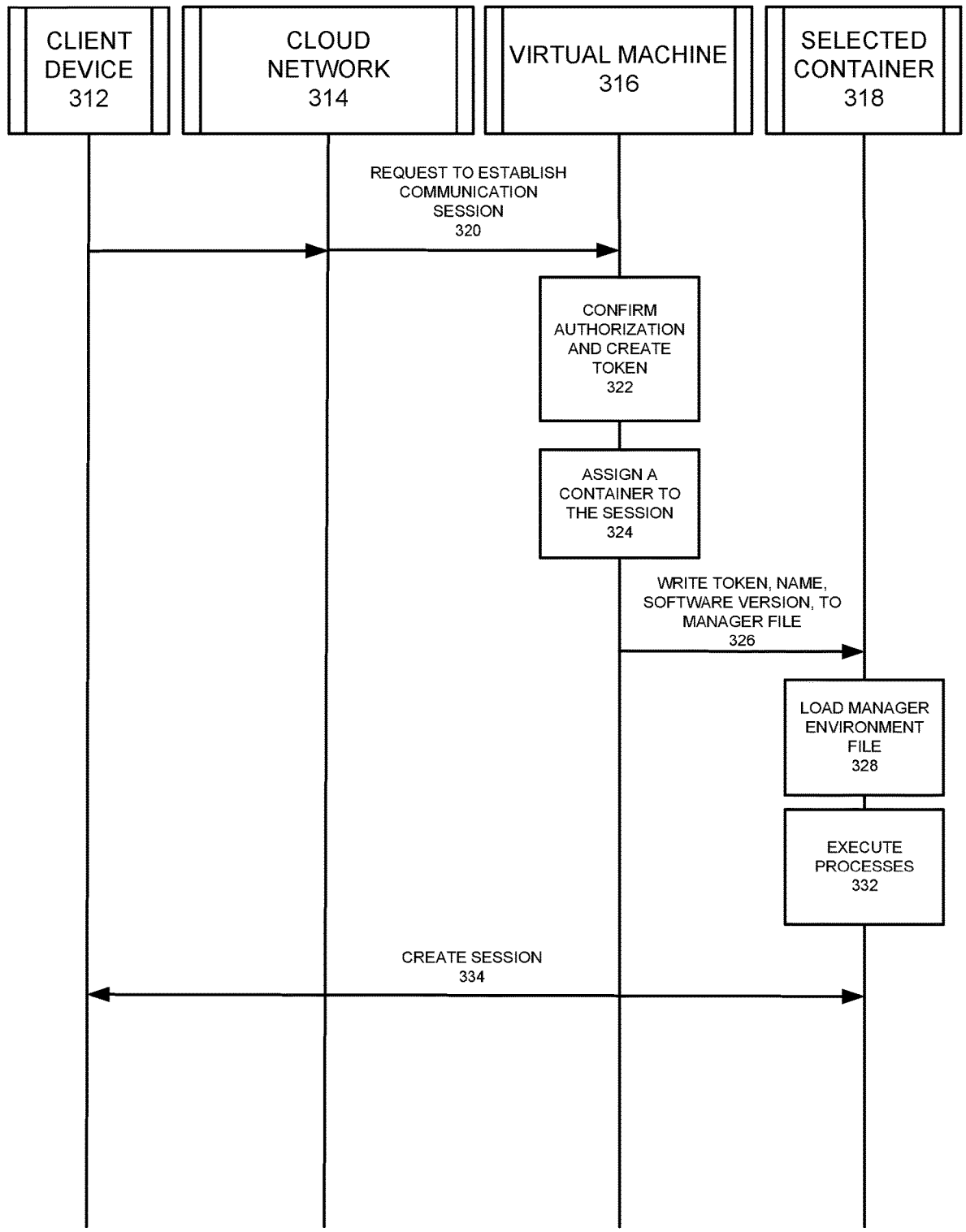
FIG. 3 illustrates an example system diagram of a communication flow between a client device and a container for a communication session according to example embodiments.

FIG. 3 illustrates an example system diagram of a communication flow between a client device and a container for a communication session according to example embodiments. Referring to FIG. 3, the configuration 300 includes a client device 312 attempting to access a cloud network 314 resource application. The application may be a data network access application, such as a multiple session data network connection with channel bonding and network data optimization. However, other applications may also be accessed across the cloud network to an assigned container.

In this example, the client device 312 sends a request 320 to establish a communication session 320 to the cloud network and the request is received at a virtual machine 316. The virtual machine 316 will confirm the request and provided an authorization and authentication operation and create or receive a token 322 that confirms the client device's identity. The token then can be assigned to a container for the session 324. The selected container 318 will have certain information written to the master management file, such as user ID, token, software version, etc. 326. The file system and other information is loaded in the container 318 and a manager file is updated 326. The file is loaded 328 and the necessary processes 332 are executed to initiate the session 334 with the client device 312. In this example, the client device may be communicating with the VPN server via a virtual machine 316 to perform a data session where data is sent to and from the VPN server via the container process managed by a virtual machine 316.

Figure 4:
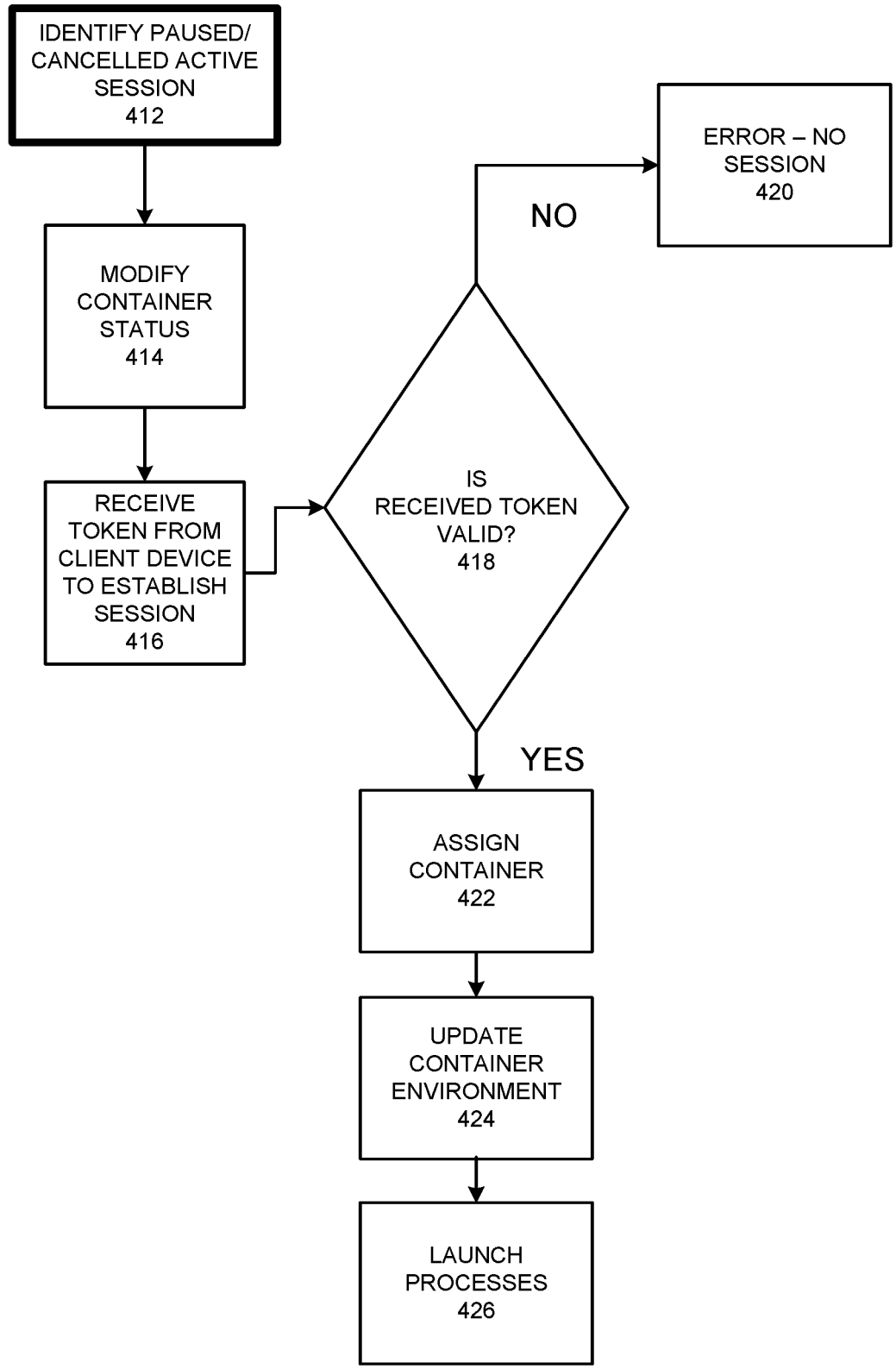
FIG. 4 illustrates a flow diagram of a process for cancelling a session and reassigning a container to a new session according to example embodiments.

FIG. 4 illustrates a flow diagram of a process for cancelling a session and reassigning a container to a new session according to example embodiments. Referring to FIG. 4, the example process 400 may include identifying a paused or cancelled active session 412, this may be based on a client device exiting a data session, or a timeout occurring based on a set amount of time. Other factors may include auditing a container status and identifying a status update, such as via an exit file which indicates the container status. The result may include modifying a status 414 of a container after a communication session has ended, this may include identifying the container as 'open' or 'available' instead of 'busy' or 'occupied'. The status may already be updated when the container is audited for a current status. The process may also include receiving a token and/or other information 416 from the client device during an application initiation cycle. When the token is validated 418, if the token is not valid then the session ends 420. If the token is valid, the container that is recently available may be assigned 422 to the user device, the container environment/management file may be updated 424 to reflect the various session information and the processes may be launched 426. The container used by the client device may be a previously used container or a new container not previously used. In either example, the container may be already operational and may not require an entire container creation process to populate the client device application with the container being used in the current session.

The process may also include receiving a token from a client device to establish a communication session with a virtual machine, assigning the client device to the container, responsive to assigning the client device, initiating one or more container processes with the container and maintaining one or more container processes already operating in an active status with the container prior to the assignment, and updating a container log file associated with the container by writing the token, a file version and a client device identifier to the container log file. The status of the container is modified from an active status to an available status.

The process may also include, responsive to modifying a status of the container, removing a previously assigned file system, the log file and one or more processes which were operating with the container, and responsive to assigning the client device to the container, loading a file system associated with an application of the client device. The maintaining one or more container processes already operating in an active status comprises maintaining a firewall process, a port range of assigned ports assigned to the container, and a virtual network adapter. The modifying the status of the container after the communication session has ended includes removing a TCP proxy process and a DNS server process from the container. The initiating one or more container processes includes initiating a new TCP proxy process and a new DNS server process with the container. Different types of server processes may be used to manage the containers depending on the application use of the container.

For example, a VPN server process performs a server-side VPN functionality for accepting transport connections from the client application, verifying the transport connections, decrypting application traffic from the VPN client and forwarding the data to the Internet for routing to an appropriate location. The VPN server process may also perform receiving Internet traffic destined for a VPN client associated with the VPN server, and encrypting the data traffic and forwarding the traffic to the VPN client of the client device. Operations such as channel bonding, traffic prioritization and using multiple transport connections may reside in this process.

Another example embodiment may include identifying an end of session for a container application, terminating a server daemon process used by the container application, executing a script to remove communication session information from the container, and removing one or more network session processes used to maintain the communication session with a client device. The process may also include releasing communication session resources dedicated to the communication session to a session resource pool and the end of session is identified based on termination of a client device session with the server.

Another example embodiment may include a process that includes pausing an active data session between a client device and a server, re-allocating session resources to a different session, and responsive to receiving a packet from the client device, re-establishing the active data session with new session resources from another paused session, based on one or more session allocation identifiers included in the packet which matches one or more session allocation identifiers stored in a session profile associated with the client device.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
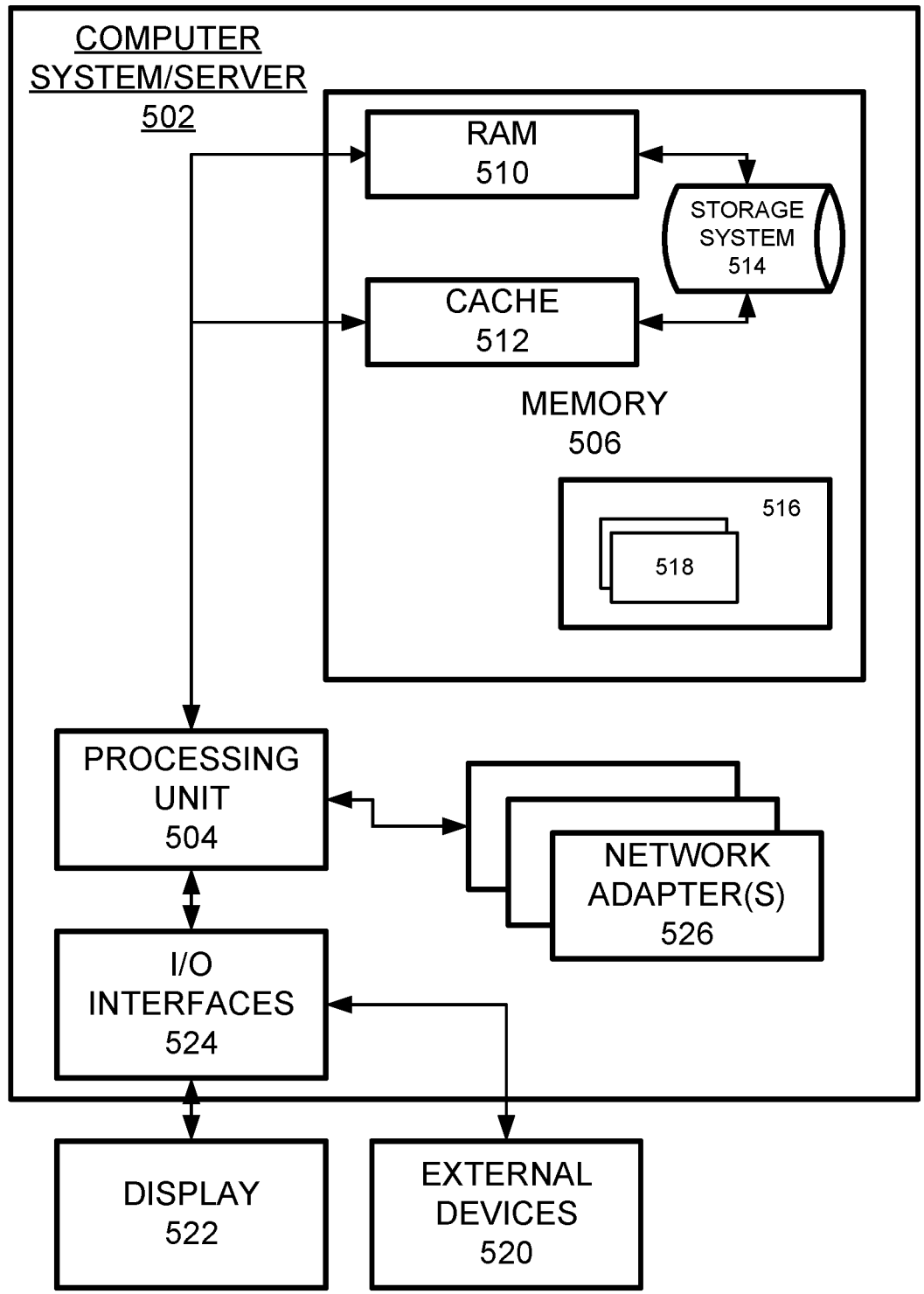
FIG. 5 illustrates an example network entity device configured to store instructions, software, and corresponding hardware for executing the same according to example embodiments.

FIG. 5 illustrates an example network entity device configured to store instructions, software, and corresponding hardware for executing the same according to example embodiments. FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 5, computer system/server 502 in cloud computing node 500 is displayed in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter(s) 526. As depicted, network adapter(s) 526 communicates with the other components of computer system/server 502 via a bus. It should be understood that although not displayed, other hardware and/or software components could be used in conjunction with computer system/server 502. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:
1. A method comprising
  determining during an audit operation a status of a container has changed from an actively assigned session to available based on an ended session being detected, wherein the container is identified as being in a dormant state and having a plurality of previously active session dependent processes which are currently cancelled and one or more active parent processes;

modifying the status of the container and maintaining the one or more active parent processes in an active status of the container, wherein the modifying the status of the container comprises updating a container state file to include a session identifier identifying the available operational status;

receiving a token from a client device to establish a communication session with a virtual machine;

assigning the client device to the container;

updating the container state file to include a client device identifier; and responsive to assigning the client device, initiating one or more new container processes with the container and maintaining the one or more active parent processes.

2. The method of claim 1, comprising responsive to modifying a status of the container, removing a previously assigned file system, the log file and one or more processes which were operating with the container.

3. The method of claim 1, comprising responsive to assigning the client device to the container, loading a file system associated with an application of the client device.

4. The method of claim 1, wherein the maintaining active parent processes already operating in an active status comprises maintaining a firewall process, a port range of assigned ports assigned to the container, and a virtual network adapter.

5. The method of claim 1, wherein modifying the status of the container after the communication session has ended comprises removing a TCP proxy process and a DNS server process from the container.

6. The method of claim 5, wherein the initiating one or more container processes comprises initiating a new TCP proxy process and a new DNS server process with the container.

7. An apparatus comprising:

a processor configured to determine during an audit operation an operational status of a container has changed from an actively assigned session to available based on an ended session being detected, wherein the container is identified as being in a dormant state and having a plurality of previously active session dependent processes which are currently cancelled and one or more active parent processes;

modify the status of the container and maintain the one or more active parent processes in an active status of the container, wherein the modifying the status of the container comprises updating a container state file to include a session identifier identifying the available operational status; and a receiver configured to receive a token from a client device to establish a communication session with a virtual machine;

wherein the processor is further configured to assign the client device to the container;

update the container state file to include a client device identifier; and responsive to the client device being assigned, initiate one or more new container processes with the container and maintain the one or more active parent processes.

8. The apparatus of claim 7, wherein the processor is further configured to responsive to a status of the container being modified, remove a previously assigned file system, the log file and one or more processes which were operating with the container.

9. The apparatus of claim 7, wherein the processor is further configured to responsive to the client device being assigned to the container, load a file system associated with an application of the client device.

10. The apparatus of claim 7, wherein the processor is further configured to maintain the active parent processes already operating in an active status by being further configured to maintain a firewall process, a port range of assigned ports assigned to the container, and a virtual network adapter.

11. The apparatus of claim 7, wherein the status of the container is modified after the communication session has ended comprises removing a TCP proxy process and a DNS server process from the container.

12. The apparatus of claim 11, wherein the one or more container processes are initiated by the processor being further configured to initiate a new TCP proxy process and a new DNS server process with the container.

13. A non-transitory computer readable medium configured to store instructions that when executed causes a processor to perform:

determining during an audit operation a status of a container has changed from an actively assigned session to available based on an ended session being detected, wherein the container is identified as being in a dormant state and having a plurality of previously active session dependent processes which are currently cancelled and one or more active parent processes;

modifying the status of the container and maintaining the one or more active parent processes in an active status of the container, wherein the modifying the status of the container comprises updating a container state file to include a session identifier identifying the available operational status;

receiving a token from a client device to establish a communication session with a virtual machine;

assigning the client device to the container;

updating the container state file to include a client device identifier; and responsive to assigning the client device, initiating one or more new container processes with the container and maintaining the one or more active parent processes.

14. The non-transitory computer readable medium of claim 13, wherein the processor is further configured to perform:

responsive to modifying a status of the container, removing a previously assigned file system, the log file and one or more processes which were operating with the container.

15. The non-transitory computer readable medium of claim 13, wherein the processor is further configured to perform:

responsive to assigning the client device to the container, loading a file system associated with an application of the client device.

16. The non-transitory computer readable medium of claim 13, wherein the maintaining the active parent processes already operating in an active status comprises maintaining a firewall process, a port range of assigned ports assigned to the container, and a virtual network adapter.

17. The non-transitory computer readable medium of claim 13, wherein modifying the status of the container after the communication session has ended comprises removing a TCP proxy process and a DNS server process from the container.

\* \* \* \* \*